United States Patent
Fischer et al.

(10) Patent No.: US 8,483,697 B2
(45) Date of Patent: Jul. 9, 2013

(54) RESOURCES MANAGEMENT IN DUAL SERVICES TERMINAL

(75) Inventors: Patrick Fischer, Paris (FR); Thierry Werling, Paris (FR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 12/447,254

(22) PCT Filed: Oct. 5, 2007

(86) PCT No.: PCT/KR2007/004869
§ 371 (c)(1),
(2), (4) Date: Feb. 26, 2010

(87) PCT Pub. No.: WO2008/050958
PCT Pub. Date: May 2, 2008

(65) Prior Publication Data
US 2010/0151869 A1   Jun. 17, 2010

Related U.S. Application Data

(60) Provisional application No. 60/863,321, filed on Oct. 27, 2006.

(51) Int. Cl.
*H04W 72/00* (2009.01)
(52) U.S. Cl.
USPC ......... 455/450; 370/328; 455/451; 455/452.1
(58) Field of Classification Search
USPC ........................................................ 455/450
See application file for complete search history.

(56) References Cited

U.S. PATENT DOCUMENTS

| | | | |
|---|---|---|---|
| 6,885,651 B1 | 4/2005 | Young | |
| 6,931,249 B2 | 8/2005 | Fors et al. | |
| 6,940,844 B2 | 9/2005 | Purkayastha et al. | |
| 2003/0139184 A1 | 7/2003 | Singh et al. | |
| 2005/0207416 A1* | 9/2005 | Rajkotia | 370/390 |
| 2005/0239497 A1* | 10/2005 | Bahl et al. | 455/552.1 |
| 2007/0191020 A1 | 8/2007 | Fischer et al. | |
| 2009/0185522 A1* | 7/2009 | Periyalwar et al. | 370/328 |

FOREIGN PATENT DOCUMENTS

| | | |
|---|---|---|
| DE | 10-2004-032916 | 2/2006 |
| JP | 2006-157890 | 6/2006 |
| WO | 2005/039201 | 4/2005 |
| WO | 2006-014092 | 2/2006 |
| WO | 2007-091823 | 8/2007 |

OTHER PUBLICATIONS

3rd Generation Partnership Project (3GPP), "Technical Specification Group Services and System Aspects; General Packet Radio Service (GPRS); Service description; Stage 2 (Release 7)", 3GPP TS 23.060 V 7.2.0, Sep. 2006.

* cited by examiner

*Primary Examiner* — Kent Chang
*Assistant Examiner* — Benjamin Morales Fernandez
(74) *Attorney, Agent, or Firm* — Lee, Hong, Degerman, Kang & Waimey

(57) ABSTRACT

Methods and apparatus are provided to minimize conflicts caused by simultaneous unicast and broadcast transmission/reception in a mobile communication device. The mobile communication device selects a technology for the reception of a broadcast/multicast/unicast service and then disables the use of specific technologies or the use of a specific technology on a specific frequency band that might interfere with the reception of another service.

11 Claims, 8 Drawing Sheets

US 8,483,697 B2

RESOURCES MANAGEMENT IN DUAL SERVICES TERMINAL

CROSS-REFERENCE TO RELATED APPLICATIONS

This application is the National Stage filing under 35 U.S.C. §371 of International Application No. PCT/KR2007/004869, filed on Oct. 5, 2007, which claims the benefit of U.S. Provisional Application Ser. No. 60/863,321, filed on Oct. 27, 2006. Provisional Application Ser. No. 60/863,321 is hereby incorporated by reference herein in its entirety.

DISCLOSURE OF INVENTION

Technical Solution

The present invention is directed to mobile communication devices that perform simultaneous unicast transmission and reception and, specifically, to minimizing conflicts caused by simultaneous unicast and broadcast transmission and reception.

A universal mobile telecommunication system (UMTS) is a European-type, third generation IMT-2000 mobile communication system that has evolved from a European standard known as global system for mobile (GSM) communications. UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

Five technical specification groups (TSG) have been created within the 3GPP in order to achieve rapid and efficient technical development and standardization of the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $I_{ub}$ interface. Each RNC 4 controls several NodeBs 5. Each NodeB 5 controls one or several cells, where a cell covers a given geographical area on a given frequency.

Each RNC 4 is connected via the Iu interface to the mobile switching center (MSC) 6 entity of the CN 3 and the general packet radio service (GPRS) support Node (SGSN) 7 entity of the CN. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the $G_S$ interface, to the gateway GPRS support node (GGSN) 9 via the $G_N$ interface, and to the home subscriber server (HSS) 10 via the $G_r$ interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs 4. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated in FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The protocol layers can be divided into a first layer (L1), a second layer (L2), and a third layer (L3) based on the three lower layers of an open system interconnection (OSI) standard model.

The U-plane is a region that handles traffic information with the user, such as voice or Internet protocol (IP) packets. The C-plane is a region that handles control information for an interface with a network as well as maintenance and management of a call.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources.

The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or the radio access channel (RACH) in the uplink. The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network for this purpose, a function called header compression.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs). The RRC also handles user mobility within the RAN and additional services, such as location services.

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods.

Not all different possibilities for the mapping between the RBs and the transport channels for a given UE 1 are available all the time. The UE 1/UTRAN 2 determine the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

The RLC layer is a layer 2 protocol that is used in order to control data exchanged between RNC 4 logical channels and the UE 1. The RLC layer can currently be configured in 3 types of transfer modes, specifically transparent mode, unacknowledged mode and acknowledged mode. The different functionalities that are available depend on the transfer mode.

SDUs can be split into smaller PDUs that are used for transmission over the air interface in acknowledged and unacknowledged mode. The transmitter side separates the SDU into PDUs and the receiver side re-assembles the PDUs based on control information that is added to the PDUs in order to reconstruct the SDUs. The control information added to the PDUs is, for example, a PDU sequence number to allow detection of lost PDUs or a length indicator (LI) that indicates the beginning or end of a SDU inside an RLC PDU.

The receiver doesn't send a confirmation of correctly received PDUs to the transmitter in unacknowledged mode. The receiver side just reassembles PDUs into SDUs based on signaling information contained in the PDUs and transfers the complete SDUs to higher layers.

The receiver sends acknowledgements for correctly received PDUs in acknowledged mode. The transmitter uses these acknowledgements in order to initiate retransmissions of missing PDUs. The acknowledgements are sent under certain conditions.

There are several mechanisms for initiating the transmission of acknowledgements for PDUs received by the receiver. The mechanisms that are activated are defined in the standard and/or configured by RRC signaling.

One example of a mechanism for the transmission of a status PDU is the reception of a PDU with a sequence number that does not correspond to the latest received sequence number increased by one or when the receiver receives an indication from the transmitter in the RLC control information that an acknowledgment, or "status," should be sent. The transmitter indication to send a status PDU is called "polling."

A mechanism is defined in the UMTS standard for when no status report is received within a certain time after the transmitter sends a polling bit. This mechanism initiates a re-transmission by the transmitter of a PDU including the polling indicator. The mechanism is called a "timer poll."

The RRC mode is related to whether a logical connection exists between the RRC of the UE 1 and the RRC of the UTRAN 2. The UE 1 is said to be in RRC connected mode if there is a connection and the UE is said to be in idle mode if there is no connection.

The UTRAN 2 can determine the existence of a particular UE 1 within the unit of cells because an RRC connection exists for UEs in RRC connected mode. For example, the UTRAN 2 can determine in which cell or set of cells the RRC connected mode UE 1 is located and to which physical channel the UE 1 is listening. Therefore, the UE 1 can be effectively controlled.

In contrast, the UTRAN 2 cannot determine the existence of a UE 1 in idle mode. The existence of idle mode UEs 1 can only be determined by the CN 3 and to within a region that is larger than a cell, such as a location or a routing area. Therefore, the existence of idle mode UEs 1 is determined within large regions and the idle mode UE must move or change into the RRC connected mode in order to receive mobile communication services such as voice or data. The possible transitions between modes and states are shown in FIG. 6.

A UE 1 in RRC connected mode can be in different states, such as CELL_FACH state, CELL_PCH state, CELL_DCH state or URA_PCH state. Other states are also contemplated. A UE 1 performs different actions and listens to different channels depending on the state it is in.

A UE 1 in CELL_DCH state will try to listen to DCH-type transport channels among others. DCH type transport channels include DTCH and DCCH transport channels, which can be mapped to a certain DPCH, DPDSCH, or other physical channels. A UE 1 in CELL_FACH state will listen to several FACH transport channels that are mapped to a certain S-CCPCH. A UE 1 in PCH state will listen to the PICH channel and the PCH channel that is mapped to a certain S-CCPCH physical channel.

The main system information is sent on the BCCH logical channel, which is mapped on the primary common control physical channel (P-CCPCH). Specific system information blocks can be sent on the FACH channel. The UE 1 receives the configuration of the FACH either on the BCCH that is received on P-CCPCH or on a dedicated channel when the system information is sent on FACH.

The system frame number (SFN) is sent in each frame or set of two frames when system information is sent on the BCCH, such as via the P-CCPCH. The SFN is used in order to share the same timing reference between the UE 1 and the NodeB 5.

The P-CCPCH is always sent using the same scrambling code used by the primary common pilot channel (P-CPICH), which is the primary scrambling code of the cell. The spreading code used by the P-CCPCH is always number 1 and has a fixed spreading factor (SF) of 256.

The UE 1 is informed of the primary scrambling code. The UE 1 may be informed of the primary scrambling code via information sent from the network on system information of neighboring cells that the UE has read, such as messages that the UE has received on the DCCH channel. On the other hand, the UE 1 may be informed of the primary scrambling code by searching for the P-CPICH, which always transmits a fixed pattern sent using the fixed SF 256 and spreading code number 0.

The system information includes information on neighboring cells, configuration of the RACH and FACH transport channels, and configuration of MICH and MCCH channels that are dedicated channels for the MBMS service. The UE 1 verifies that it has valid system information each time it changes the cell on which it is camping in idle mode or when the it has selected a cell in CELL_FACH, CELL_PCH or URA_PCH state.

The system information is organized according to system information blocks (SIBs), a master information block (MIB) and scheduling blocks. The MIB is sent very frequently and provides timing information of the scheduling blocks and the different SIBs.

The MIB also contains information on the last version of a part of the SIBs for SIBs that are linked to a value tag. SIBs linked to a value tag are valid only if they have the same value tag as the SIB broadcast in the MIB. SIBs that are not linked to a value tag are linked to an expiration timer and are invalid and must be re-read if the elapsed time since last reading the SIB exceeds this timer value.

Each block has an area scope of validity, such as Cell, PLMN or equivalent PLMN, that signifies on which cells the SIB is valid. An SIB with area scope "Cell" is valid only for the cell in which it has been read. An SIB with area scope "PLMN" is valid in the whole PLMN. An SIB with the area scope "equivalent PLMN" is valid in the whole PLMN and equivalent PLMN.

UEs 1 generally read the system information of the cells that they have selected or the cell on which they are camping when they are in idle mode, CELL_FACH state, CELL_PCH state or URA_PCH state. A UE 1 receives information on the neighboring cells on the same frequency, different frequencies, and different Radio access technologies (RAT) in the system information. This informs the UE 1 of cells that are candidates for cell reselection.

MBMS was introduced in the UMTS standard in Release 6 of the specification, which describes techniques for optimized transmission of MBMS bearer service in UTRA, such as point-to-multipoint (P-T-M) transmission, selective combining and transmission mode selection between point-to-multipoint and point-to-point (P-T-P) bearer. Optimized transmission of MBMS bearer service is used in order to save radio resources when the same content is sent to multiple users and enables TV-like services.

MBMS data can be split into two categories, specifically C-plane information and U-plane information. C-plane information is sent in order to allow UEs 1 to receive MBMS bearer specific control information for MBMS and contains information on physical layer configuration, transport channel configuration, RB configuration, ongoing services, counting information and scheduling information. U-plane data of MBMS bearers may be mapped onto dedicated transport channels for a P-T-P service, which is sent only to one UE 1, or on a shared transport channel for P-T-M service, which is transmitted to and received by several users at the same time.

P-T-P transmission is used to transfer MBMS specific control and U-plane information as well as dedicated control and U-plane information between the network and one UE 1 in RRC Connected Mode. P-T-M is used for the multicast or the broadcast mode of MBMS. DTCH is used for a UE 1 in CELL_FACH and CELL_DCH, thereby allowing all existing mappings to transport channels.

A function called counting has been introduced in MBMS in order to allow the use of cell resources in an optimized manner. A counting procedure, as illustrated in FIG. 7, is used to determine how many UEs 1 are interested in receiving a given service. FIG. 7 illustrates the general principle of a counting procedure.

A UE 1 that is interested in a certain service receives information related to availability of an MBMS service (S 10). The RNC 4 can also inform the UE 1 that it should indicate its interest in the service to the network in the same information, such as by transmitting the "access information" on the MCCH channel. A probability factor included in the access information message ensures that an interested UE 1 will only respond with a given probability.

A UE 1 will inform the RNC 4 that it is interested in a given service by sending a RRC Connection Setup message or Cell update message to the RNC in the cell in which the UE has received the counting information (S20). The UE 1 may include an identifier indicating the service in which it is interested.

A UE 1 camping on one frequency might not be aware of an MBMS service transmitted on a different frequency when a network operates on several frequencies. A frequency convergence procedure allows a UE 1 to receive information on a first frequency that indicates a given service is available on a second frequency.

The MBMS point-to-multipoint Control Channel (MCCH) is used for a P-T-M downlink transmission of C-plane information between a RNC 4 and UEs 1 in RRC Connected or Idle Mode. The C-plane information on MCCH is MBMS specific and is sent to UEs1 in a cell with an activated MBMS service. MCCH can be sent in S-CCPCH carrying the DCCH of the UEs in CELL_FACH state, in stand alone S-CCPCH, or in the same S-CCPCH with MTCH.

The MCCH is always mapped to one specific FACH in the S-CCPCH as indicated on the BCCH. The MCCH is mapped to a different S-CCPCH, or CCTrCH in TDD, than MTCH if soft combining is used.

Paging reception has priority over reception of MCCH for UEs 1 in Idle mode and URA/CELL_PCH state. The configuration of the MCCH, such as modification period and repetition period, is indicated in the system information sent on the BCCH channel.

The MBMS point-to-multipoint traffic channel (MTCH) is used for a P-T-M downlink transmission of user plane information between a network and UEs 1 in RRC Connected or Idle Mode. The user plane information on MTCH is MBMS Service specific and is sent to UEs 1 in a cell with an activated MBMS service. The MTCH is always mapped to one specific FACH in the S-CCPCH, as indicated on the MCCH.

The MBMS point-to-multipoint scheduling channel (MSCH) is used for a P-T-M downlink transmission of MBMS service transmission schedule between a network and UEs in RRC Connected or Idle Mode. The control plane information on MSCH is MBMS service and S-CCPCH specific and is sent to UEs in a cell receiving MTCH.

One MSCH is sent in each S-CCPCH carrying the MTCH. The MSCH is always mapped to one specific FACH in the S-CCPCH, as indicated on the MCCH. The MSCH is mapped to a different FACH than MTCH due to different error requirements.

FACH is used as a transport channel for MTCH, MSCH and MCCH. SCCPCH is used as a physical channel for FACH carrying MTCH, MCCH or MSCH.

The possible connections between logical channels and transport channels that exist only in downlink are MCCH mapped to FACH, MTCH mapped to FACH, and MSCH mapped to FACH. The mappings as seen from the UE 1 and UTRAN 2 sides are illustrated in FIGS. 8 and 9.

UM-RLC mode is used for MCCH mapped to FACH, with required enhancements to support out of sequence SDU delivery. A MAC header is used for logical channel type identification.

UM-RLC mode is used for MTCH mapped to FACH, with required enhancements to support selective combining. Quick repeat may be used in RLC-UM. A MAC header is used for logical channel type identification and MBMS service identification.

UM-RLC mode is used for MSCH mapped to FACH. A MAC header is used for logical channel type identification.

MBMS notification utilizes a new MBMS specific PICH in a cell, specifically MBMS notification indicator channel (MICH). The exact coding is defined in Stage-3 physical layer specifications.

The MCCH information is transmitted based on a fixed schedule. This schedule will identify the transmission time interval (TTI), such as multiple of frames, containing the beginning of the MCCH information. The transmission of this information can take a variable number of TTIs and the UTRAN 2 should transmit MCCH information in consecutive TTIs.

A UE 1 will keep receiving the S-CCPCH until either all of the MCCH information is received, a TTI is received that does not include any MCCH data, or the information contents indicate further reception is not required, such as no modification to the desired service information. The UTRAN 2 can repeat the MCCH information following a scheduled transmission in order to improve reliability based on this behavior. The MCCH schedule is common for all services.

The entire MCCH information will be transmitted periodically based on a "repetition period." A "modification period" is defined as an integer multiple of the "repetition period." The MBMS ACCESS INFORMATION may be transmitted periodically based on an "access info period," which is an integer divider of the "repetition period." The values for the "repetition period" and "modification period" are provided in the system information of the cell in which MBMS is sent.

MCCH information is split into critical and non-critical information. Critical information includes the MBMS NEIGHBOURING CELL INFORMATION, MBMS SERVICE INFORMATION and MBMS RADIO BEARER INFORMATION. Non-critical information corresponds to the MBMS ACCESS INFORMATION.

Changes to critical information will only be applied at the first MCCH transmission of a modification period and at the beginning of each modification period. Changes to non-critical information could take place at any time.

The UTRAN 2 transmits the MBMS CHANGE INFORMATION including MBMS services IDs whose MCCH information is modified at that modification period. MBMS CHANGE INFORMATION is repeated at least once in each repetition period of that modification period.

FIG. 10 illustrates the schedule with which the MBMS SERVICE INFORMATION and RADIO BEARER INFORMATION is transmitted. Different shading in FIG. 10 indicates potentially different MCCH content.

A UE 1 that is located between different cells can receive the same MBMS services from the different cells at the same time and combine the received information in order to increase the coverage, as illustrated in FIG. 11. The UE 1 reads the MCCH from one cell that it has selected based on a certain algorithm.

As illustrated in FIG. 11, the UE 1 receives information related to a service in which it is interested on the MCCH from the selected cell, such as A-B. The information is related to the current cell, such as the configuration of the physical channels, the transport channels, the RLC configuration and the PDCP configuration. The information also is related to the neighboring cells, such as A-A and cell B, that the UE 1 might be able to receive, specifically information that the UE needs in order to receive the MTCH carrying the service in which the UE is interested in cell A-A, A-B and B.

A UE 1 may or may not be able to combine the service from different cells when the same service is transmitted in different cells. Combining can be done at different levels, specifically no combining possible, selective combining at RLC level, L1 combining at physical level, or selective and L1 combining for MBMS P-T-M transmission.

RLC PDU numbering supports selective combining for MBMS P-T-M transmission. Selective combining in the UE 1 is possible from cells providing similar MBMS RB bit rate as long as the de-synchronization between MBMS P-T-M transmission streams does not exceed the RLC re-ordering capability of the UE. Therefore, one RLC entity exists at the UE 1 side.

One RLC entity per MBMS service utilizing P-T-M transmission in the cell group of the CRNC 4 exists for selective combining. The same CRNC 4 controls all cells in the cell group. The CRNC 4 may perform re-synchronization actions enabling UEs 1 to perform selective combining between neighboring cells if de-synchronization occurs between MBMS transmissions in neighboring cells belonging to an MBMS cell group.

Selective combining and soft combining can be used when Node-Bs 5 are synchronized for TDD. Soft combining can be used when Node-Bs 5 are synchronized inside a UE's 1 soft combining reception window for FDD and the data fields of the soft combined S-CCPCHs are identical during soft combining periods.

The UTRAN 2 should send MBMS NEIGHBOURING CELL INFORMATION containing the MTCH configuration of the neighboring cells that are available for selective or soft combining between cells. The MBMS NEIGHBOURING CELL INFORMATION contains the L1-combining schedule, which indicates the time periods when a UE 1 may soft combine the S-CCPCH transmitted in neighboring cells with the S-CCPCH transmitted in the serving cell when partial soft combining is applied. A UE 1 is able to receive MTCH transmission from a neighboring cell without reception of the MCCH of the neighboring cell with the MBMS NEIGHBOURING CELL INFORMATION.

A UE 1 determines the neighboring cell suitable for selective or soft combining based on a threshold, such as measured CPICH Ec/No, and the presence of MBMS NEIGHBOURING CELL INFORMATION of the neighbor cell. The possibility of performing selective or soft combining is signaled to the UE 1.

UEs 1 generally integrate different radio technologies for unicast transmission, such as UMTS, CDMA2000, EV-DO, GSM, GPRS, EDGE, W-LAN and Bluetooth. UEs 1 also integrate receiver functions such as for MBMS receivers for FDD or TDD, DVB-H or DMB services. These different services operate in different frequency bands.

The DVB-H reception frequency band is 470-862 MHz, with other frequency bands not excluded. The DAB-DMB reception frequency bands are the VHF frequency band III of 174-230 MHz for channel number 4 to 11, with DAB-DMB also implemented in the 1452-1492 MHz range or L Band.

Tables I-III list the frequency bands normally used for unicast transmissions. Note that the table shows the extents of the band and not the center frequency. Other frequency bands will most likely be added in the future and it has been proposed that the TDD frequencies could be used to accommodate MBMS and/or broadcast transmissions.

Devices that perform simultaneous unicast transmission and reception were not considered when spectrums were allocated for broadcast/multicast services. Simultaneous unicast and broadcast transmission/reception can cause conflicts between the unicast transmission/reception and the broadcast reception for several reasons, such as re-use of dedicated hardware and incompatibility of the designs of the radio circuits.

For example, a UE 1 that supports simultaneous operation on GSM/EDGE and the reception of DVB-H with frequencies over 750 MHz will be difficult to implement if the 900 or 850 frequency band is used for transmission of the GSM signal. This is because the transmitted GSM/EDGE signal is much stronger than the DVB-H signal received in the UE 1 antenna and, therefore, will interfere with the received signal.

Another example is when the 1900-1920 MHz TDD frequency is used for transmission of MBMS and simultaneous FDD unicast transmission on 1920-1980 MHz is performed in the uplink. The UE 1 uplink transmission will strongly interfere with the UE reception and make it practically impossible in an integrated UE 1.

Another example is when a UE 1 performs simultaneous reception of UMTS on one frequency for MBMS and unicast reception on UMTS. This implies that the UE 1 must implement two UMTS receivers and, therefore, handset cost increases while the GSM receiver or other additional receivers remain unused.

Table I Unicast GSM Frequency Bands

TABLE 1

| System | Band | Uplink | Downlink | Channel Number |
|---|---|---|---|---|
| GSM 400 | 450 | 450.4-457.6 | 460.4-467.6 | 259-293 |
| GSM 400 | 480 | 478.8-486.0 | 488.8-496.0 | 306-340 |
| GSM 850 | 850 | 824.0-849.0 | 869.0-894.0 | 128-251 |
| GSM 900 (P-GSM) | 900 | 890.0-915.0 | 935.0-960.0 | 1-124 |
| GSM 900 (E-GSM) | 900 | 880.0-915.0 | 925.0-960.0 | 975-1023, (0, 1-124) |
| GSM-R (R-GSM) | 900 | 876.0-880.0 | 921.0-925.0 | 955-973 |
| DSC 1800 | 1800 | 1710.0-1785.0 | 1805.0-1880.0 | 512-885 |
| PCS 1900 | 1900 | 1850.0-1910.0 | 1930.0-1990.0 | 512-810 |

Table II Unicast UMTS Frequency Bands for FDD

TABLE 2

| Operating Band | UL Frequencies UE transmit, Node B receive | DL frequencies UE receive, Node B transmit |
|---|---|---|
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |
| VII | 2500-2570 MHz | 2620-2690 MHz |
| VIII | 880-915 MHz | 925-960 MHz |
| IX | 1749.9-1784.9 MHz | 1844.9-1879.9 MHz |

Table III Unicast UMTS Frequency Bands for TDD

TABLE 3

| a | 1900-1920 MHz | Uplink and downlink transmission |
| | 2010-2025 MHz | Uplink and downlink transmission |
| b | 1850-1910 MHz | Uplink and downlink transmission |
| | 1930-1990 MHz | Uplink and downlink transmission |
| c | 1910-1930 MHz | Uplink and downlink transmission |
| d | 2570-2620 MHz | Uplink and downlink transmission |

In one aspect of the present invention, a method for a mobile terminal communicating with a network is provided. The method includes activating a first function, determining at least a second function whose activation conflicts with the first function and one of replacing either the first function or the at least second function with a third function and providing an indication to a network that activation of the at least second function conflicts with the first function in order to continue performing the first function, wherein the first function and the at least second function utilize at least one of different frequency bands and technologies.

It is contemplated that the method further includes de-activating a currently performed function and one of replacing the third function with either the first function or the at least second function and providing an indication to the network that activation of the at least second function no longer conflicts with the first function. It is further contemplated that replacing the third function with either the first function or the at least second function includes transmitting at least one parameter to the network in order to cause the function change.

It is contemplated that the method further includes prohibiting activation of the at least second function. It is further contemplated that prohibiting activation of the at least second function includes providing an indication to the network that the at least second function is not available.

It is contemplated that the method further includes de-activating a currently performed function and no longer prohibiting activation of the at least second function. It is further contemplated that no longer prohibiting activation of the at least second function includes providing an indication to the network that the at least second function is available.

It is contemplated that replacing either the first function or the at least second function with a third function and prohibiting activation of the at least second function is conditioned on predetermined rules. It is further contemplated that the predetermined rules are implemented according to information received from the network.

It is contemplated that replacing either the first function or the at least second function with a third function includes transmitting at least one parameter to the network, the parameter specifically intended to cause the function change. It is further contemplated that the method further includes providing information to the network regarding the determined conflict. Preferably, the method further includes providing an indication of conflicting functions to the network upon establishing communication with the network.

In another aspect of the present invention, a method for a network communicating with a mobile terminal is provided. The method includes receiving an indication from the mobile terminal that activation of at least one function conflicts with another function and prohibiting activation of the at least one function, wherein the first function and the at least second function utilize at least one of different frequency bands and technologies. Preferably, the method further includes receiving information from the mobile terminal regarding a determined conflict between at least two activated functions and directing the mobile terminal to use one of different frequency bands and technologies for one of the conflicting functions.

In another aspect of the present invention, a mobile terminal for providing communication services is provided. The mobile terminal includes a transmitting/receiving unit providing information to a network and receiving information from the network, the information regarding functions performed by the mobile terminal, a display unit displaying user interface information, an input unit receiving inputs from a user and a processing unit activating a first function, determining at least a second function whose activation conflicts with the first function, and one of replacing either the first function or the at least second function with a third function and providing an indication to the network that activation of the at least second function conflicts with the first function in order to continue performing the first function, wherein the first function and the at least second function utilize at least one of different frequency bands and technologies.

It is contemplated that the processing unit further de-activates a currently performed function and one of replaces the third function with either the first function or the at least second function and provides an indication to the network that activation of the at least second function no longer conflicts with the first function. It is further contemplated that the processing unit replaces the third function with either the first function or the at least second function by controlling the transmitting/receiving unit to transmit least one parameter to the network in order to cause the function change.

It is contemplated that the processing unit further prohibits activation of the at least second function. It is further contemplated that the processing unit prohibits activation of the at least second function by controlling the transmitting/receiving unit to transmit an indication to the network that the at least second function is not available.

It is contemplated that the processing unit further de-activates a currently performed function and no longer prohibits activation of the at least second function. It is further contemplated that the processing unit no longer prohibits activation of the at least second function by controlling the transmitting/receiving unit to transmit an indication to the network that the at least second function is available.

It is contemplated that the processing unit replaces either the first function or the at least second function with a third function and prohibits the activation of the at least second function according to predetermined rules. It is further contemplated that the processing unit implements the predetermined rules according to information received from the network.

It is contemplated that the processing unit replaces either the first function or the at least second function with a third function by controlling the transmitting/receiving unit to transmit at least one parameter to the network, the parameter specifically intended to cause the function change. It is further contemplated that the processing unit controls the transmitting/receiving unit to transmit information to the network regarding the determined conflict. Preferably, the processing unit controls the transmitting/receiving unit to transmit an indication of conflicting functions to the network upon establishing communication with the network.

In another aspect of the present invention, a network for communicating with a mobile terminal is provided. The network includes a receiver receiving an indication from the mobile terminal that activation of at least one function conflicts with another function and a controller prohibiting activation of the at least one function, wherein the first function and the at least second function utilize at least one of different frequency bands and technologies. Preferably, the receiver receives information from the mobile terminal regarding a determined conflict between at least two activated functions and the controller directs the mobile terminal to use one of different frequency bands and technologies for one of the conflicting functions.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

MODE FOR THE INVENTION

Reference will now be made in detail to the preferred embodiments of the present invention, examples of which are illustrated in the accompanying drawings. The present invention proposes that a UE select a technology for the reception of a broadcast/multicast/unicast service and then disable the use of specific technologies or the use of a specific technology on a frequency band that might interfere with the reception of another service.

For example, use of unicast service may be limited if broadcast/MBMS service has already been chosen, or vice versa. This is possible because most of operators today have different networks available and/or provide services on different frequency bands that provide the same unicast services, but with somewhat different QoS.

As a first example, consider a UE 1 that starts the reception of a UMTS broadcast or MBMS service whilst simultaneously receiving speech or data. The UE 1 may disable the capability to use UMTS for unicast services and switch to the reception of GSM or the UE may disable the UMTS service on specific frequency bands.

As a second example, consider a UE 1 that receives a DVB-H service on a specific band. The UE 1 may disable support of GSM service and continue service on UMTS technology or CDMA technology only or the UE may disable support for GSM service on specific frequency bands that interfere with the DVB-H service.

As a third example, consider a UE 1 that starts to receive MBMS services on UMTS. The UE 1 may disable the capacity to receive unicast services on MBMS, especially if the TDD spectrum 1900-1920 MHz is used for the transmission of the service, or the UE may disable support for UMTS on adjacent frequency bands.

As a fourth example, consider that broadcast is activated for current 3GPP LTE standards. Unicast reception for LTE may then be disabled.

Figure 1:
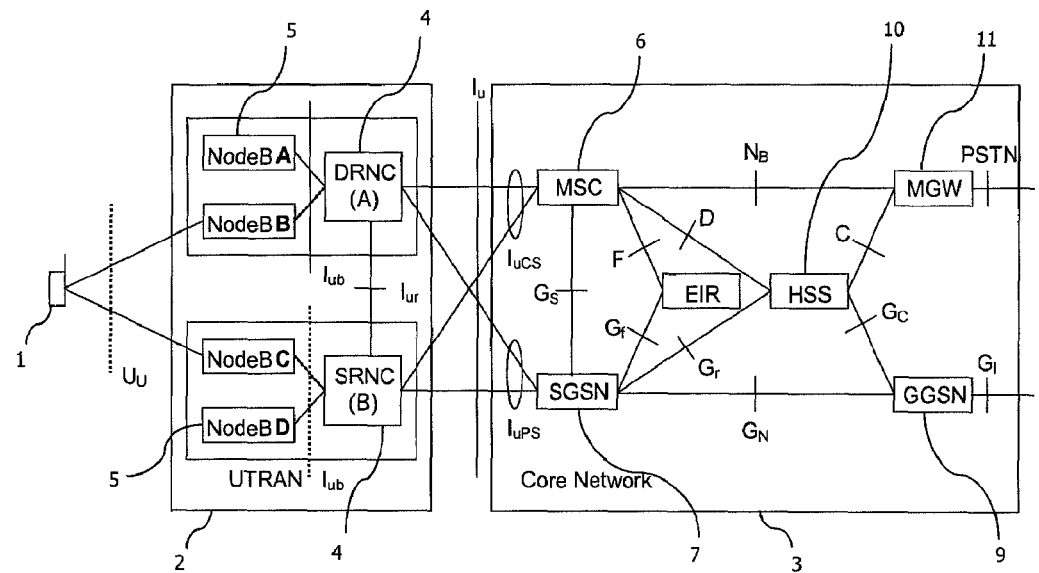
FIG. 1 illustrates Network elements.
Figure 2:
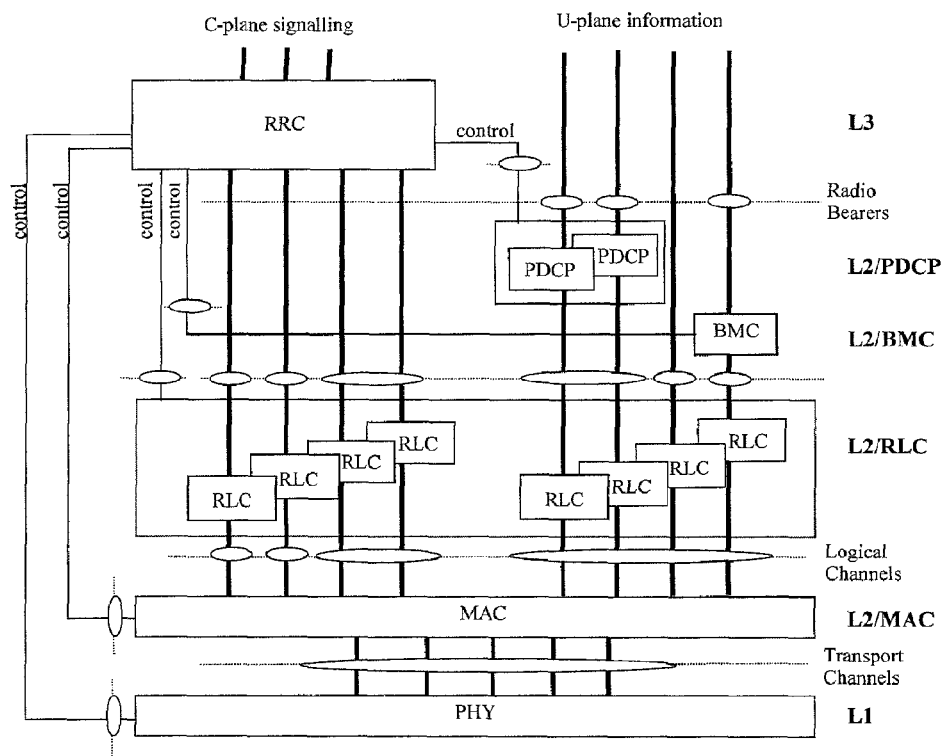
FIG. 2 illustrates RAN functions.
Figure 3:
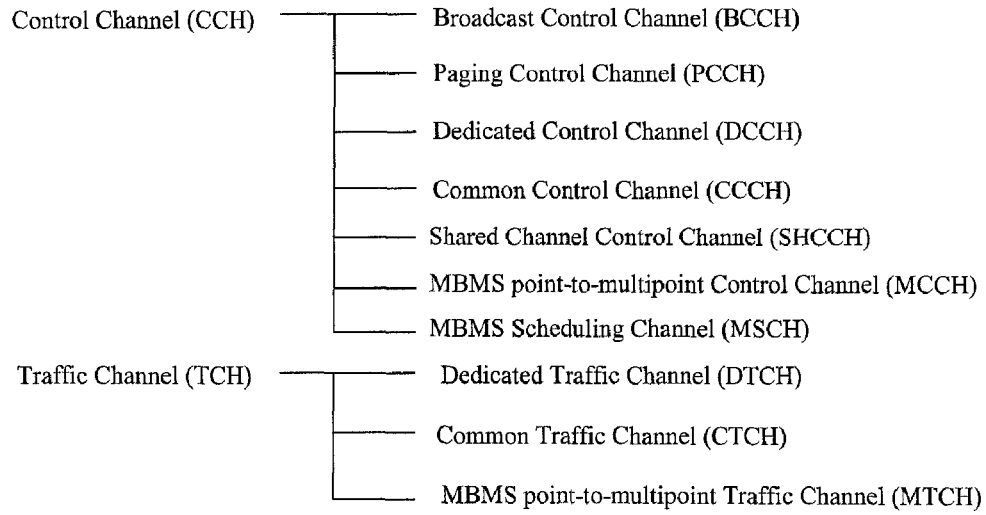
FIG. 3 illustrates logical channels.
Figure 4:
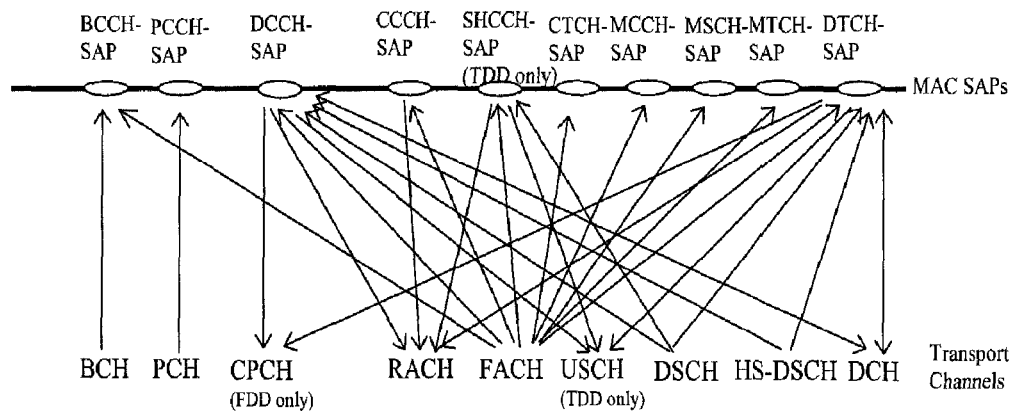
FIG. 4 illustrates logical channels mapped onto transport channels as seen from the UE side.
Figure 5:
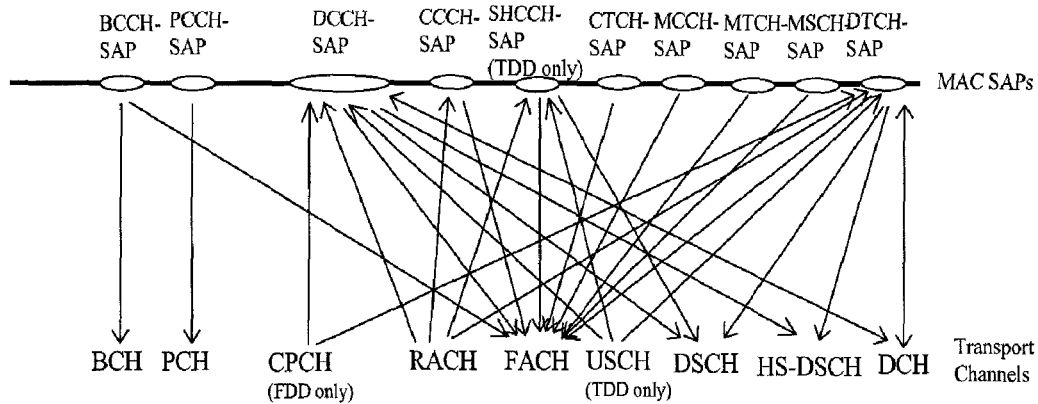
FIG. 5 illustrates logical channels mapped onto transport channels as seen from the UTRAN side.
Figure 6:
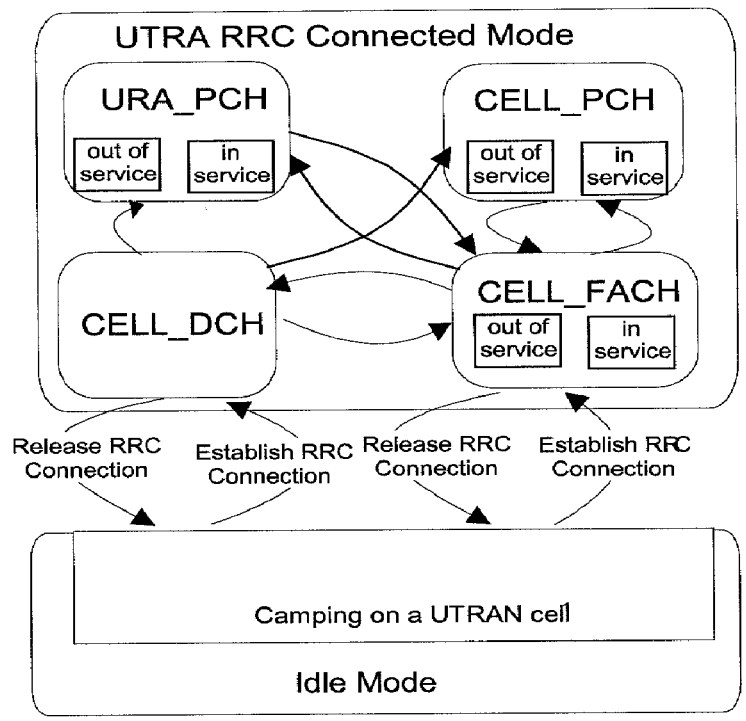
FIG. 6 illustrates state transitions.
Figure 7:
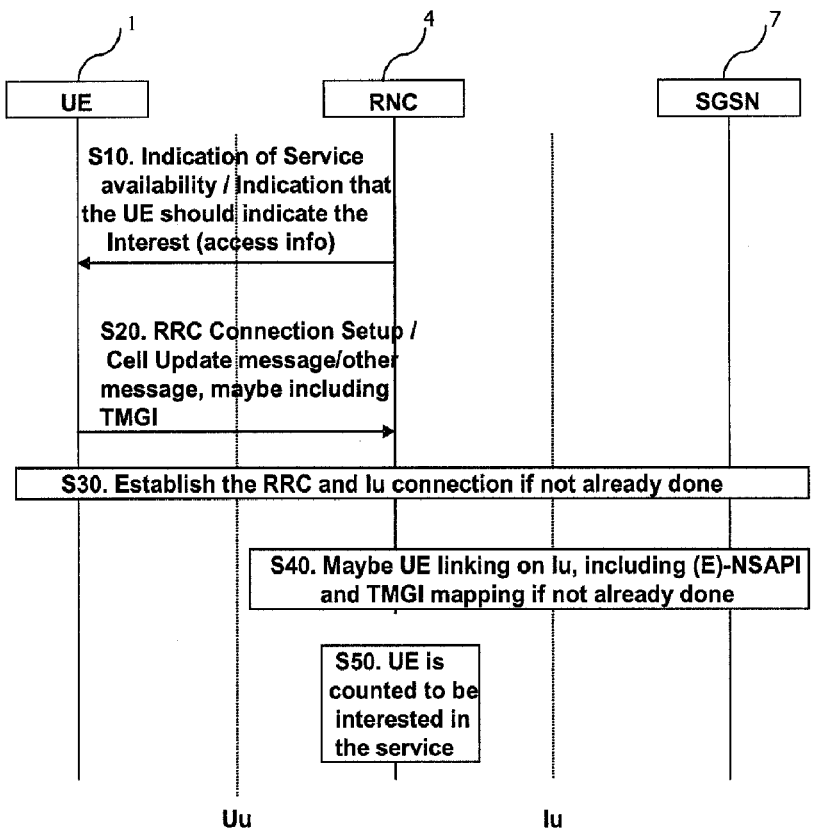
FIG. 7 illustrates a counting procedure.
Figure 8:
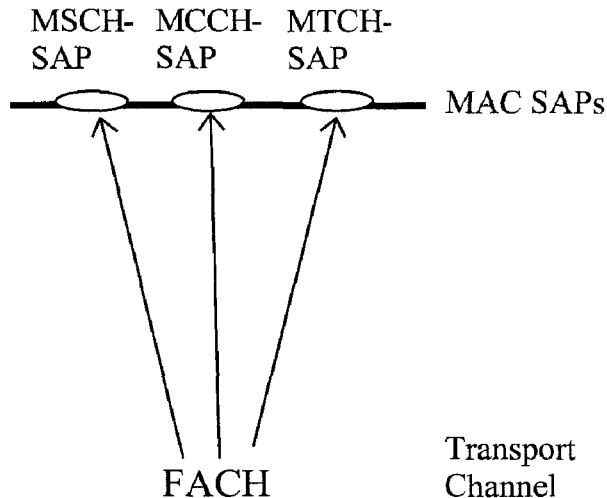
FIG. 8 illustrates logical channels mapped onto FACH as seen from the UE side.
Figure 9:
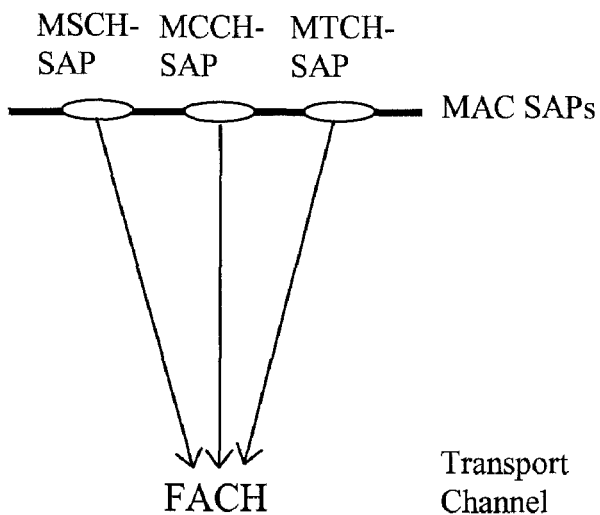
FIG. 9 illustrates logical channels mapped onto FACH as seen from the UTRAN side.
Figure 10:
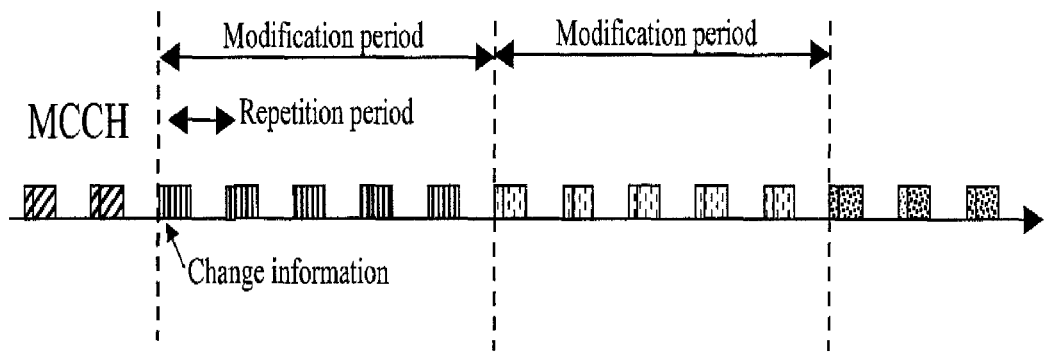
FIG. 10 illustrates an MCCH information schedule.
Figure 11:
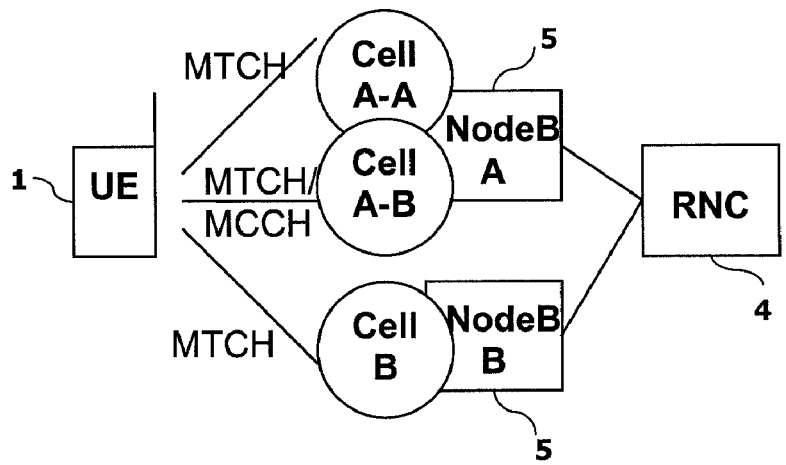
FIG. 11 illustrates a UE receiving MBMS from several cells.
Figure 12:
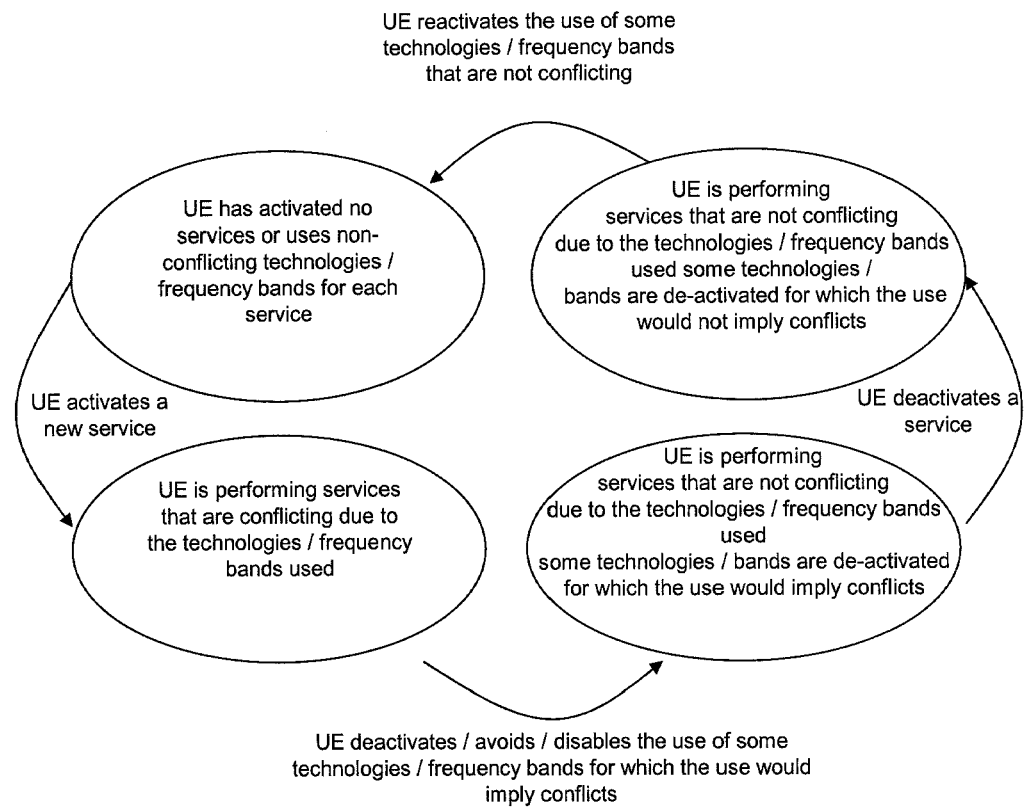
FIG. 12 illustrates a general principle of activating and de-activating conflicting technologies/frequency bands.

The previous examples assume that a unicast service conflicts with a MBMS/broadcast service. However, the invention is applicable for any combinations of conflicting services. FIG. 12 illustrates the principle of the present invention.

Disabling a capability can be done locally in the UE 1 when not in a connected state, such as when the UE is not in RRC connected mode for UMTS. The UE 1 would reselect to a cell of the corresponding technology by taking into account the new cap ability, such as the UE being only GSM capable or only UMTS capable instead of both GSM and UMTS capable, and thereby efficiently perform the same procedure as during a normal reselection between two cells of different technologies.

The UE 1 might previously have communicated its capabilities to the network and which might be stored in the network. Therefore, it is necessary that the UE informs the network that it no longer supports the disabled technology and/or frequency bands. Preferably this is done after the UE 1 has switched to a cell from the previously supported technology and/or frequency band.

The UE 1 would update its capabilities again after reception of the multicast/broadcast is completed. This update would again enable the use of the previously disabled conflicting technology and/or frequency bands.

The principle is more complicated when the UE 1 disables support of a technology and/or a frequency bands while connected to a system, such as when the UE is in RRC connected mode. Two situations are considered, specifically when UE 1 mobility is UE controlled and when UE mobility is network controlled.

Figure 13:
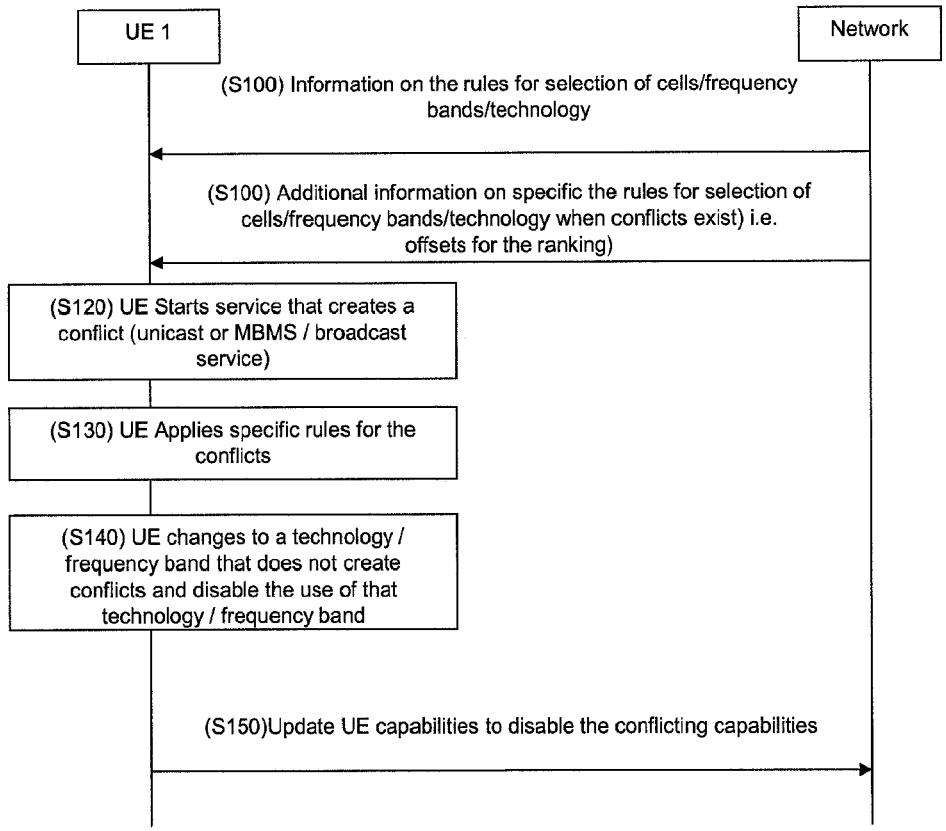
FIG. 13 illustrates activating and de-activating technologies/frequency bands with UE controlled mobility.

The UE 1 determines which cells/frequencies/technologies it should choose when UE mobility is UE controlled, as illustrated in FIG. 13. The determination is based on UE 1 measurements and rules received from the network (S100).

The determination of the best cell/frequency/technology is similar to when the UE 1 is in idle mode or not connected to the network. Additional or new rules could be provided to the UE 1 in order to account for the choice of the technology/frequency band when the UE receives an MBMS or broadcast frequency (S110).

After the UE 1 starts a service that creates a conflict (S120), the UE typically performs measurements and a ranking for different cells in order to determine the best cell and chooses the best-ranked cells (S130). The UE 1 then disables a conflicting technology/frequency band and changes to a non-conflicting technology/frequency band (S140). The UE 1 may indicate its updated capabilities to the network in order to disable the conflicting technology/frequency band (S150).

The UE 1 could add an offset to the measurements of a cell in order to reselect to a non-conflicting cell when reception of broadcast and/or MBMS services is ongoing. The offset could be broadcast via system information, broadcast together with MBMS/broadcast control information, or sent in a dedicated manner as part of the additional information.

Figure 14:
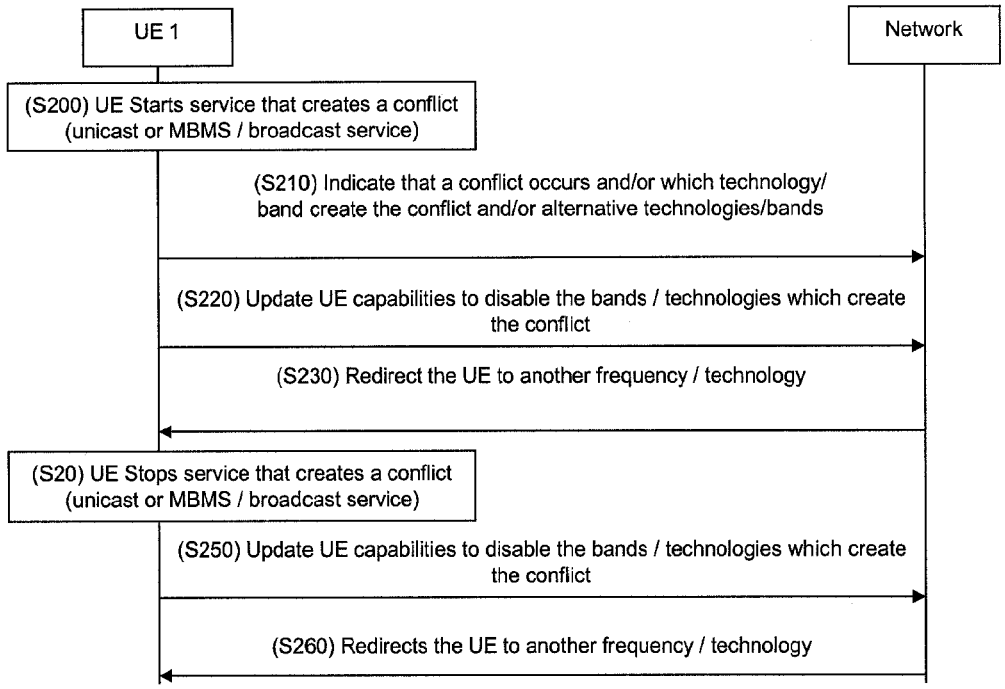
FIG. 14 illustrates a first approach to activating and de-activating technologies/frequency bands with network controlled mobility.

The network must be informed that the UE 1 cannot simultaneously use a specific unicast service for a certain frequency and/or technology in order to receive an MBMS/broadcast service when UE mobility is controlled by the network, as illustrated in FIG. 14. This can be done by the UE 1 indicating the conflict to the network (S210) when the UE starts reception of a MBMS/broadcast service or starts transmission of a unicast service that creates a conflict (S200).

The network can then take appropriate actions, such as updating the UE 1 capabilities to exclude the technologies/frequency bands that are conflicting (5220) or redirecting the UE to a network/frequency that does not present the conflict (S230).

The UE 1 could update its capabilities again (S250) when the conflicting MBMS/broadcast reception or unicast transmission is finished (S240). The network may then redirect the UE to a different frequency/technology (S260) in view of the new capabilities.

Figure 15:
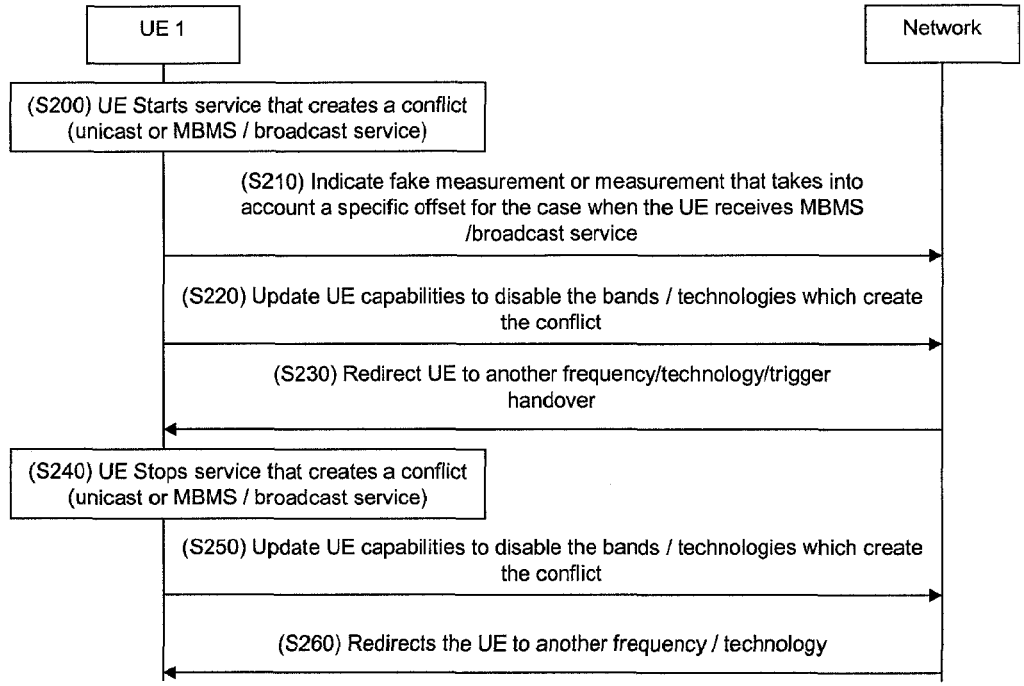
FIG. 15 illustrates activating and de-activating technologies/frequency bands by fake measurements with network controlled mobility.

It is also contemplated that the UE 1 may reduce the impact on the network by indicating fake measurements to the network (S215) in order to trigger the handover to the other technology/frequency band, as illustrated in FIG. 15. This could be accomplished, for example, by adding an offset to the measured quality of one technology in a manner similar when UE 1 mobility is UE controlled. An offset could be indicated to the UE 1 per neighboring cell/frequency or technology such that the UE can apply the offset when MBMS reception is active.

Figure 16:
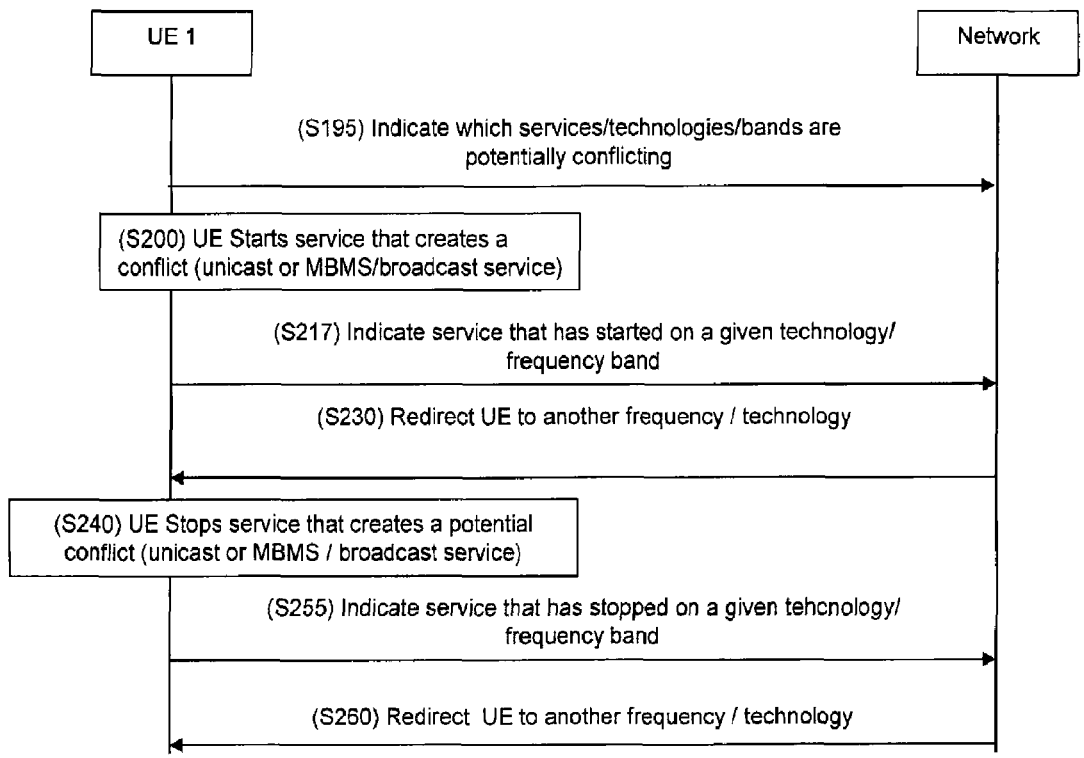
FIG. 16 illustrates a second approach to activating and de-activating technologies/frequency bands with network controlled mobility.

It is also contemplated that the UE 1 may indicate potentially conflicting services/technologies/frequency bands (S195) before the establishment of a connection (S200), as illustrated in FIG. 16. The network would only need to be informed when the UE 1 is starting to receive a MBMS/broadcast session (S217) and can then automatically redirect the UE 1 to another frequency/technology (S260) when a unicast service is started.

Figure 17:
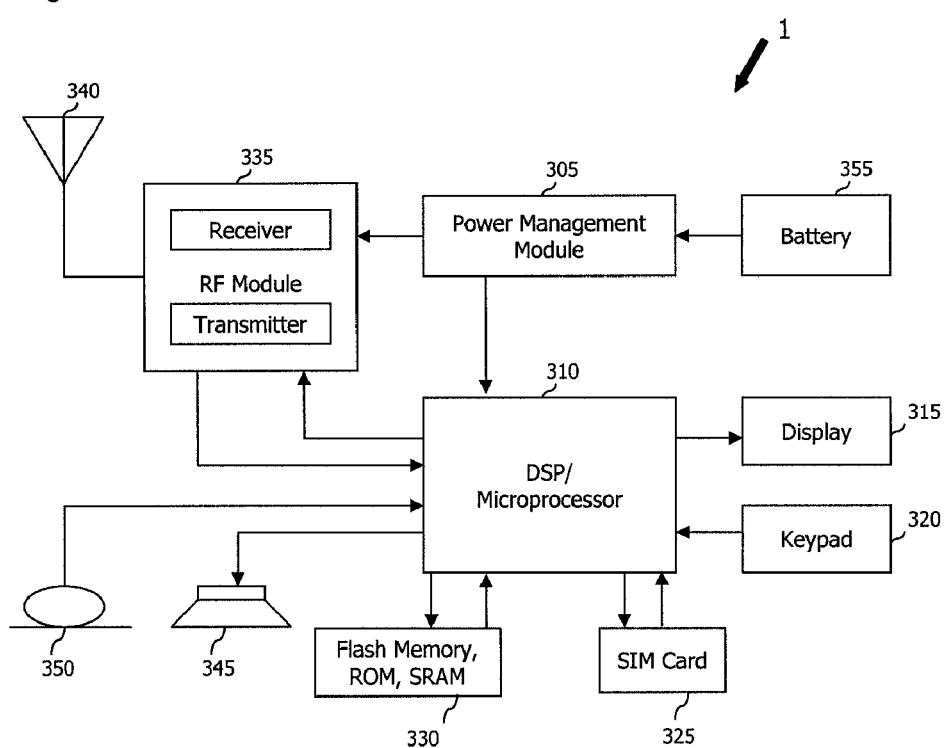
FIG. 17 illustrates a block diagram of a mobile station (MS) or UE.

FIG. 17 illustrates a block diagram of a mobile station (MS) or UE 1. The UE 1 includes a processor (or digital signal processor) 310, RF module 335, power management module 305, antenna 340, battery 355, display 315, keypad 320, memory 330, SIM card 325 (which may be optional), speaker 345 and microphone 350.

A user enters instructional information, such as a telephone number, for example, by pushing the buttons of a keypad 320 or by voice activation using the microphone 350. The microprocessor 310 receives and processes the instructional information to perform the appropriate function, such as to dial the telephone number. Operational data may be retrieved from the Subscriber Identity Module (SIM) card 325 or the memory module 330 to perform the function. Furthermore, the processor 310 may display the instructional and operational information on the display 315 for the user's reference and convenience.

The processor 310 issues instructional information to the RF module 335, to initiate communication, for example, transmits radio signals comprising voice communication data. The RF module 335 comprises a receiver and a transmitter to receive and transmit radio signals. An antenna 340 facilitates the transmission and reception of radio signals. Upon receiving radio signals, the RF module 335 may forward and convert the signals to baseband frequency for processing by the processor 310. The processed signals would be transformed into audible or readable information outputted via the speaker 345, for example. The processor 310 also includes the protocols and functions necessary to perform the various processes described herein.

This present invention is applicable to a network and/or a terminal when the network provides a unicast and/or broadcast/multicast service and the terminal is not able to receive two services simultaneously via specific combinations of technologies and/or frequency bands. One advantage of the present invention is that there is a smaller impact on the network than when entire functionalities, such as HSDPA or HSUPA, are disabled.

However, the network might not even be aware why the UE 1 needs to trigger a handover when biased measurements are transmitted, as illustrated in FIG. 15, and network resource management capabilities may degrade. It is possible that the network may control resources between technologies better when a technology is updated, but the network would have to implement some extra functionality.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for a mobile terminal communicating with a network, the method comprising:
   activating, at the mobile terminal, a first service with the network;
   determining at least one second service with the network whose activation, at the mobile terminal, conflicts with the first service;
   replacing either the first service or the at least one second service with a third service upon the determining that the activation of the at least one second service conflicts with the first service,
   wherein the third service with the network is for activation at the mobile terminal;
   transmitting an indication to the network when the activation of
   the at least one second service conflicts with the first service, wherein the indication indicates that the at least one second service conflicts with the first service;
   de-activating a service currently being performed; and
   replacing the third service with either the first service or the at least one second service or providing an indication to the network that activation of the at least one second service no longer conflicts with the first service,
   wherein the first service and the at least one second service utilize at least different frequency bands or different technologies, and
   wherein the first service, the at least one second service, and the third service are individually one of a unicast service provided by the network, a multicast service provided by the network, or a broadcast service provided by the network.

2. The method of claim 1 wherein replacing the third service with either the first service or the at least one second service includes transmitting at least one parameter to the network in order to cause the service change.

3. The method of claim 1, further comprising prohibiting activation of the at least one second service.

4. The method of claim 3, wherein prohibiting activation of the at least one second service includes providing an indication to the network that the at least one second service is not available.

5. The method of claim 3, wherein replacing either the first service or the at least one second service with the third service and prohibiting activation of the at least one second service are conditioned on predetermined rules.

6. The method of claim 5, further comprising implementing the predetermined rules according to information received from the network.

7. The method of claim 1, wherein replacing either the first service or the at least one second service with the third service comprises transmitting at least one parameter to the network, the at least one parameter specifically intended to cause the service change.

8. The method of claim 1, further comprising providing information to the network regarding the determined conflict.

9. The method of claim 1, further comprising providing an indication of conflicting services to the network upon establishing communication with the network.

10. A method for a network communicating with a mobile terminal, the method comprising:

providing a first service to the mobile terminal, the first service being a service that is activated at the mobile terminal;

receiving an indication from the mobile terminal that activation, at the mobile terminal, of at least a second service conflicts with the first service;

prohibiting activation of the at least one second service with the mobile terminal based upon the indication received from the mobile terminal; and replacing the at least one second service with a third service, wherein the third service is for activation at the mobile terminal, de-activating a service currently being provided to the mobile terminal; and replacing the third service with either the first service or the at least one second service or receiving an indication from the mobile terminal that activation of the at least one second service no longer conflicts with the first service; and wherein the first service and the at least one second service are configured to utilize at least different frequency bands or different technologies, wherein the first service, the at least one second service, and the third service are individually one of a unicast service provided by the network, a multicast service provided by the network, or a broadcast service provided by the network.

11. The method of claim 10, further comprising:

receiving information from the mobile terminal regarding a determined conflict; and directing the mobile terminal to use different frequency bands or different technologies for one currently activated service.

\* \* \* \* \*